May 17, 1960 D. L. STINSON 2,937,140
TREATMENT OF PETROLEUM WELL EFFLUENTS
Filed July 19, 1956
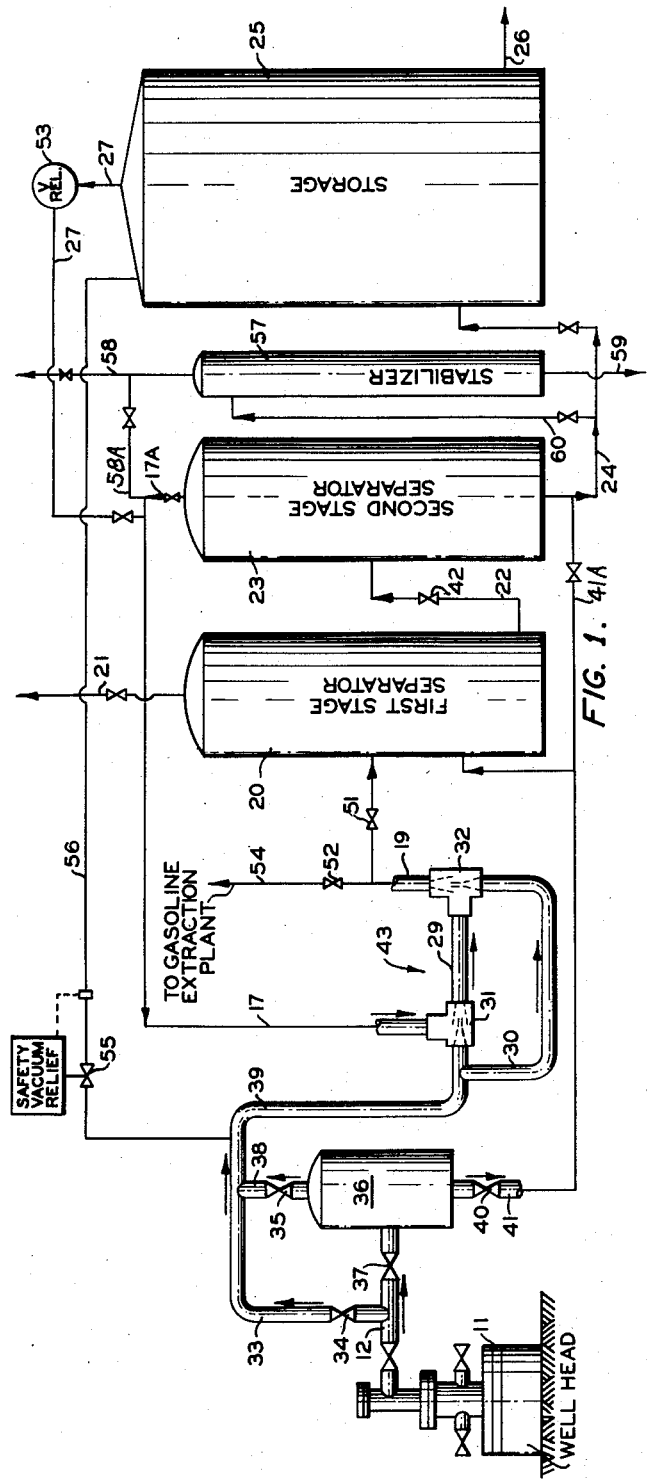
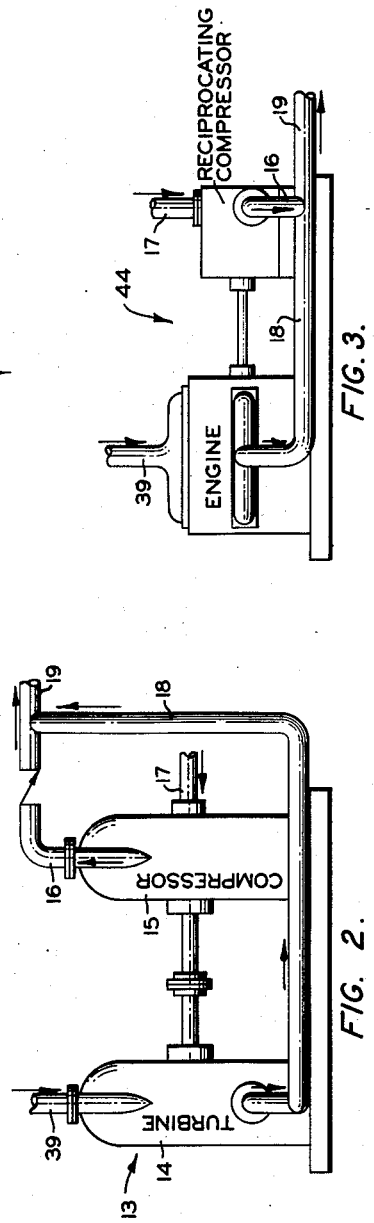
INVENTOR.
D. L. STINSON
BY
ATTORNEYS

United States Patent Office 2,937,140
Patented May 17, 1960

2,937,140

TREATMENT OF PETROLEUM WELL EFFLUENTS

Donald L. Stinson, Bartlesville, Okla., assignor to Phillips Petroleum Company, a corporation of Delaware Application July 19, 1956, Serial No. 598,963

5 Claims. (Cl. 208—340)

This invention relates to treatment of petroleum well effluent. In one aspect it relates to treatment of distillate well effluent for recovery of liquids. In another aspect it relates to a method for the treatment of petroleum well effluent for increasing recovery of liquids therefrom over prior art methods. In yet another aspect it relates to treatment of petroleum well effluents in the field for eliminating conventional oil field losses due to weathering and for increasing recovery of liquids over prior art methods.

High pressure distillate well effluent of 2,000 to 4,000 pounds per square inch is often passed into a first stage separator wherein gas is separated from liquid at a pressure considerably below well head pressure. Liquid from the first stage separator is passed into a second stage separator at a still lower pressure wherein vapors are separated from liquid. The liquid from the second stage separator is passed either to a stock tank from which evolved vapors are lots to the atmosphere or the liquid is passed to a stabilizer for production of a stable natural gasoline product with stabilizer off-gases being vented. The vapors from the second stage separator are usually vented to the atmosphere or passed to a lean oil absorber for recovery of the gasoline content thereof. In any event, venting of gaseous constituents from such operations to the atmosphere obviously means loss of valuable hydrocarbons.

The term oil well or wells is herein intended to include wells producing hydrocarbon distillate, condensate or natural gas condensate as well as crude oil, and the term oil well effluent is intended to include hydrocarbon distillate, condensate or natural gas condensate as well as crude oil produced by respective wells, and also the terms petroleum well and petroleum well effluent.

By the practice of my invention I operate a high pressure, or distillate well effluent liquid recovery system wherein I recover larger volumes of liquid constituents than in prior art systems.

One object of my invention is to provide a high pressure well effluent liquid recovery system.

Another object of my invention is to provide apparatus and a method for the recovery of oil field stock tank vapors which are frequently vented to the atmosphere and lost.

Another object of my invention is to provide a distillate well effluent liquid recovery system in which greater recovery of liquid hydrocarbons is achieved than in many prior art processes.

Another object of my invention is to provide a distillate well effluent liquid recovery system in which power required for operation of the system is obtained from the high pressure effluent from the well.

Still other objects and advantages of my invention will be realized upon reading the following description which, taken with the attached drawing, forms a part of this specification.

In the drawing, Figure 1 illustrates in diagrammatic form, an arrangement of apparatus parts suitable for carrying out the process of my invention.

Figure 2 illustrates diagrammatically an alternate form of a portion of the apparatus of Figure 1.

Figure 3 illustrates another alternate form of a portion of the apparatus of Figure 1.

Specifically, I have devised a process for recovering gasoline boiling range hydrocarbons from a natural gas condensate well effluent comprising expanding said effluent in a retrograde condensation operation with the production of work by reducing the pressure on the well effluent to a superatmospheric pressure within the retrograde condensation range wherein condensate is formed passing said condensate and uncondensed well effluent from said expanding operation into a first separation zone and therein separating condensate from uncondensed gas, withdrawing separated condensate from said first separation zone, reducing the pressure of the withdrawn condensate in a flashing operation with the production of flash vapors and flashed liquid, withdrawing the flashed liquid as a gasoline boiling range hydrocarbon product of the process, passing said flash vapors into a compression zone and therein compressing said vapor to said superatmospheric retrograde condensate producing pressure and passing the compressed vapors into said first separation zone, said compression zone being powered by said work produced in the aforementioned retrograde condensation operation and withdrawing uncondensed gas from said first separation zone as a second product of the process.

Furthermore my invention includes a process for recovering low pressure hydrocarbon vapors comprising passing high pressure well production effluent into a phase separation zone and therein separating a high pressure vapor phase from a high pressure liquid phase, withdrawing said liquid phase and reducing its pressure and passing the material of reduced pressure into a storage zone, withdrawing vapors from said storage zone, passing the withdrawn vapors into a jet compression zone, withdrawing the high pressure vapor phase from said phase separation zone and compressing said withdrawn vapors in said jet compression zone by passing the withdrawn high pressure vapor phase through said compression zone and recovering separator zone vapors containing compressed storage zone vapors as a product of the process, storage zone liquid being another product.

As an example of the operation of the process of my invention, I will describe such a process wherein the distillate well effluent is reduced to a pressure of about 750 pounds per square inch absolute. At this pressure the gas phase is vented and the liquid phase is passed through a second pressure reduction stage to about 150 pounds per square inch absolute and into a second and low pressure separator. A second gas phase is separated from a second liquid phase. The second liquid phase is passed to further stabilization or to storage or to other disposal as desired. The second gas phase separated in the low pressure separator is compressed and is introduced into the first stage or high pressure separator to promote condensation of the more condensible constituents of the low pressure separator gas. By this method I am able to obtain a greater recovery of the liquid from the second stage separator than when the low pressure separator gas is not compressed and introduced into the high pressure separator.

The step of compressing the low pressure separator gas to the high pressure separator pressure is an important part of my invention. For this step I have devised means for utilizing the high pressure of the distillate well effluent for accomplishing the compression without the use of extraneous power.

While in the example herein described I utilize a pressure of 750 pounds per square inch absolute in the high pressure separator, particular pressure is not critical and I prefer to employ pressure from about 700 to 1,000 pounds per square inch absolute in the high pressure separator. Under some conditions pressures higher than 1,000 pounds per square inch absolute can be employed in the high pressure separator. Similarly, I give herein 150 pounds per square inch absolute as an example of the pressure maintained in the low pressure separator, but pressures in this second separator can vary from about 25 to 500 pounds per square inch absolute.

Referring to the drawings and specifically to Figure 1, well distillate or well effluent is passed from a well head 11 through a pipe 12 and through pipes 33 and 39 with valve 34 being open into a jet compressor assembly 43 in which high pressure well effluent draws gas or vapor from pipe 17 at the above-mentioned 150 pounds per square inch absolute and compresses it to about 750 pounds per square inch with the simultaneous reduction of pressure of well effluent to said 750 pounds per square inch absolute. The combined well effluent and the second stage separator gases at said pressure of 750 pounds per square inch absolute are passed through pipe 19 into a first stage separator 20. Vent gases from separator 20 are withdrawn through pipe 21 for such disposal as desired. The liquid from separator 20 is passed through pipe 22 with valve 42 being open into a second and low pressure separator 23 at the above mentioned pressure of 150 pounds per square inch absolute. From this second stage separator liquid is withdrawn through a pipe 24 and is passed to a storage tank 25 or for such other disposal as desired. In the example of Figure 1 liquid from the second separator is passed into storage tank 25 and gases evolved therefrom (are in prior art vented to the atmosphere through a pipe 27 or) are passed through pipes 27 and 17 for treatment as subsequently described. Make liquid or gasoline from storage tank 25 is passed for ultimate disposal through a pipe 26.

Gases evolved in the pressure reduction of the liquid on passing through valve 42 into separator 23 are removed through a pipe 17A for passage through pipe 17 to the jet compressor 43.

The jet compressor 43 in the illustration given comprises two jets 31 and 32 which are disposed in series. In series operation high pressure well effluent flows from pipe 39 into the jet 31 and by the inspirating action on flowing through jet 31 draws gases from pipe 17 into the jet stream and these gases from pipe 17 are mixed with the well effluent at the pressure existing at the outlet of the jet, and the mixture passes on through conduit 29. A bypass pipe 30 communicates with pipe 39 upstream of jet 31 and conducts high pressure well effluent to the inlet of jet 32. The high pressure well effluent passing through jet 32 draws combined well effluent and second stage separator gas from pipe 29 into this jet and the combined stream issues from jet 32 at a pressure intermediate that in pipe 29 and pipe 30 and flows through pipe 19 into the first stage separator. As mentioned above, pressure in the first stage separator is maintained at about 750 pounds per square inch absolute.

One form of two stage jet compressor suitable for carrying out this compression is described in United States Patent 1,898,637.

By the use of such a jet compressor system for compressing second stage separator gases to the first stage separator pressure, no moving mechanical parts are required. When apparatus is employed in which there are no moving mechanical parts, need for personal supervision is greatly reduced.

If desired, the flash liquid from the second separator 23 is passed via pipe 24 and pipe 60 with its valve open into a stabilizer 57. The valve in pipe 24 is closed. In stabilizer 57 the more volatile constituents are fractionated from the liquid. The stabilized liquid is withdrawn via pipe 59 for passage to storage, or such use as desired, while stripped gas is removed via pipe 58 or, if desired, is passed through pipe 58A, with its valve being open, into pipe 17.

However, under some conditions it is desirable to use, for example, a turbo compressor assembly, or a reciprocating pressure assembly.

In Figure 2 of the drawing is illustrated a turbo compressor assembly suitable for compressing gas from such a second stage separator pressure to the first stage separator pressure. In this compressor high pressure well effluent from pipe 39 flows into the high pressure side of turbine 14 and exhaust gases issue therefrom through a pipe 18. This turbine is directly connected to a rotary compressor 15 which takes suction on pipe 17 from the second stage separator and delivers compressed gas through pipe 16. The compressed gas in pipe 16 is combined with the turbine exhaust from pipe 18 and the combined gases are passed on through pipe 19 into the first stage separator.

Referring to Figure 3 in which is illustrated a reciprocating compressor assembly 44. The engine end of the assembly receives high pressure power gas from pipe 39, the gas being exhausted therefrom into pipe 18. The compressor takes suction from pipe 17 and exhausts into pipe 16 from which the compressed gases are combined with exhaust gases from the engine in pipe 18 and the mixture is passed on through pipe 19 into the first stage separator.

When using the compressor assemblies illustrated in Figures 2 and 3, it is obvious that manual supervision will be required at least occasionally to make certain that the mechanical apparatus is operating properly.

Under conditions when the distillate well effluent contains liquid condensate at the well head, it may be desired to separate the liquid from the gas before passing the well effluent to the compressor system. In this case valve 34 in pipe 33 is closed and valve 37 in pipe 12 is opened so that the well effluent flows into the separator tank 36. Gas phase from this separator tank 36 flows through open valve 35 in pipe 38 and through pipe 39 into the compressor. Liquid condensate from separator 36 is withdrawn through pipe 41 with valve 40 being open and is introduced into the first stage separator 20.

The pressure reduction of the well effluent gases on going through the pressure reduction portion or engine of the compressor assembly is intended to be reduced in pressure to such an extent as to provide a maximum amount of retrograde condensate due to the pressure reduction. Thus the pressure maintained in the first stage separator is selected so as to obtain the maximum amount of condensation produced by retrograde condensation from the well effluent gases on passing through the pressure reduction stage or stages. It is intended in the operation of my invention that the temperature decrease occasioned during pressure reduction will cause normal condensation to supplement the retrograde condensation caused by the pressure reduction of the effluent gases passing through the pressure reduction step of the pressure system. In other words, it is intended that the liquid produced by pressure reduction within a retrograde pressure condensation region be supplemented by normal condensation caused by the normal temperature decrease outside of the retrograde temperature region as fully explained in U.S. Patent 2,391,576.

To illustrate the increase in yield of gasoline boiling range hydrocarbons produced according to my process in comparison to that produced in prior art methods, the following tabulations are given. Table I illustrates the composition and yields in terms of mols of product obtained in various stages of a prior art method, and the second tabulation illustrates the composition of products and yields in terms of mols according to the herein disclosed process.

Table 1

| Composition Hydrocarbons | Feed, 100° F.+2,000 p.s.i.a. | HP Sep. 70° F. Vent Gas, 750 p.s.i.a. | L.P. Sep. Vent Gas | 70° F., 150 p.s.i.a., Liquid Make |
|---|---|---|---|---|
| $C_1$ | 72.24 | 82.65 | 57.02 | 3.00 |
| $C_2$ | 9.46 | 9.29 | 19.83 | 6.55 |
| $C_3$ | 7.79 | 5.72 | 16.40 | 19.29 |
| $C_4$ | 4.27 | 1.90 | 5.82 | 20.78 |
| $C_5$ | 1.42 | .30 | .71 | 9.78 |
| $C_6$ | .97 | .08 | .16 | 7.73 |
| $C_7+$ | 3.85 | .04 | .06 | 32.87 |
| Total | 100.00 | 99.98 | 100.00 | 100.00 |
| No. of Mols | 100.00 | 83.80 | 4.61 | 11.59 |

Table 2

| Composition Hydrocarbons | Feed, 2,000 p.s.i.a. 100° F+ | HP Sep. 70° F. Vent Gas, 750 p.s.i.a. | L.P. Sep. 70° F., 150 p.s.i.a. Liquid Make |
|---|---|---|---|
| $C_1$ | 72.24 | 81.90 | 3.10 |
| $C_2$ | 9.46 | 9.80 | 7.01 |
| $C_3$ | 7.79 | 5.88 | 21.45 |
| $C_4$ | 4.27 | 1.98 | 20.64 |
| $C_5$ | 1.42 | .31 | 9.38 |
| $C_6$ | .97 | .08 | 7.34 |
| $C_7+$ | 3.85 | .05 | 31.08 |
| Total | 100.00 | 100.00 | 100.00 |
| No. of Mols | 100.00 | 87.74 | 12.26 |

In the above tabulations it is noted that, based on 100 mols of feed, by my process I am able to produce 12.26 mols of liquid, while in the prior art method only 11.59 mols of liquid are produced. This increase in yield obtained per 100 mols of feed will amount to considerable increase in yield when treating such large volumes of distillate well effluent as are ordinarily produced by wells. While in the above description I have stated that second stage separator gases are compressed and reintroduced into the first stage separator, if desired, the gases normally vented from such a storage tank as tank 25 can be combined with the second stage separator gases for compression and reintroduction into the first stage separator. By retreating gases normally vented from an atmospheric storage tank, still greater increases in liquid yields are obtained.

If desired, liquid from separator 36, is passed directly through pipes 41, 41A and 24 into the stock tank while relief valve 53 vapors from the stock tank pass through pipes 27 and 17 into the suction side of the compressor assembly 43. Well production effluent and compressed stock tank gases issue from compressor 43 via pipe 19 and they can, if desired, pass through valve 52 and pipe 54 to a gasoline extraction plant in which gasoline constituents are recovered from the gaseous constituents.

Also I have described the system as including only two stages of vapor-liquid separation, but it will be obvious to those skilled in the art that any number of stages can be used as, for example, 3, 4, or 5 stages of gas-liquid separation can be used. In such cases the gases vented from all these stages except the first and highest stage are, of course, compressed in the compressor system for reintroduction into the first and high pressure stage separator. Such operation also increases the yield of liquids.

When passing separator tank vapors with recovered stock tank vapors directly to a gasoline extraction plant, as via pipe 54, the pressure range of operation is many times quite different than when treating well effluent under retrograde pressures. Retrograde pressures are relatively high pressures, as hereinbefore disclosed. When recovering stock tank vapors for passage to a gasoline extraction plant, the operation includes well and separator pressures as low as 80 p.s.i. or even less.

When employing a reciprocating compressor, Figure 3, and a rotary compressor, Figure 2, well pressures can be below even 80 psi, the pressure being that required to power the engine which drives the compressor. The compressors disclosed herein, in this embodiment take suction via pipes 17 and 27 on stock tank 25. When a vacuum is inadvertently pulled on the stock tank, a safety vacuum relief valve 55 is provided for relieving the vacuum by admitting gas from pipe 39 via pipe 56 so that the tank 25 will not collapse.

The relief valve 53 is under some conditions set to pop at atmospheric pressure or at any desired pressure above atmospheric pressure for vapor recovery.

Little equipment is required for the practice of this latter embodiment of my invention, and it includes a compressor assembly 43, stock tank 25 and connecting pipes, with a pipe of course leading to a gasoline recovery plant (pipe 54), relief valve 53 and safety valve 55.

The maximum pressure employed for recovering stock tank vapors is obviously that available from the well.

Furthermore, pressure available from one well can under some conditions be employed for recovering stock tank vapors originating from one or more other wells.

While certain embodiments of the invention have been described for illustrative purposes, the invention obviously is not limited thereto.

I claim:

1. A process for recovering hydrocarbon vapors from an oil well effluent comprising passing a superatmospheric pressure oil well production effluent into a phase separation zone and therein separating a vapor phase from a liquid phase, withdrawing said liquid phase and reducing its pressure and passing the material of reduced pressure into a storage zone, withdrawing vapors from said storage zone, passing the withdrawn vapors into a compression zone, withdrawing vapor phase at said superatmospheric pressure from said separation zone, powering the compression operation in said compression zone by passing the withdrawn superatmospheric vapor phase through a power producing zone, said power producing zone powering the compression operation and thereby compressing said vapors, withdrawing compressed vapors from said compression zone and exhaust vapors from said power producing zone as the main product of the process.

2. An apparatus for the separation and recovery of liquefiable constituents from an oil well production effluent comprising, in combination, a vapor and liquid phase separator, an expansion engine-compressor assembly adapted to be powered by vapor from said oil well production effluent, the compressor of said assembly being powered by the expansion engine of said assembly, said compressor and engine each having an inlet and an outlet, a first conduit communicating the outlet of said expansion engine and the outlet of said compressor with said separator, a liquid phase storage tank, a second conduit communicating the lower and normally liquid containing space of said separator with said storage tank, a pressure reducing means in said second conduit, a third conduit communicating the upper and normally vapor containing space of said storage tank with the inlet of said compressor, a fourth conduit communicating the upper and normally vapor containing space of said separator with the upper and normally vapor containing space of said storage tank, a fifth conduit communicating the inlet of said engine with the well, a sixth conduit communicating the upper and normally vapor containing space of said storage tank with said fifth conduit, and a vacuum relief valve in said sixth conduit to relieve vacuum in said storage tank.

3. The apparatus of claim 2 wherein the expansion engine-compressor assembly is a gas jet compressor.

4. The apparatus of claim 2 wherein the expansion engine-compressor assembly is an expansion turbine-compressor assembly.

5. The apparatus of claim 2 wherein the expansion engine-compressor assembly is a reciprocating engine-compressor assembly.

References Cited in the file of this patent

UNITED STATES PATENTS

| | | |
|---|---|---|
| 2,001,996 | Whitman | May 21, 1935 |
| 2,250,716 | Legatski | July 29, 1941 |
| 2,327,187 | Hill | Aug. 17, 1943 |
| 2,449,095 | Wheeler et al. | Sept. 14, 1948 |
| 2,617,276 | Gard et al. | Nov. 11, 1952 |
| 2,666,019 | Winn et al. | Jan. 12, 1954 |
| 2,756,192 | Bergstrom | July 24, 1956 |
| 2,765,045 | Meyers | Oct. 2, 1956 |
| 2,782,141 | King | Feb. 19, 1957 |
| 2,784,798 | Miller et al. | Mar. 12, 1957 |